United States Patent [19]

Jones

[11] Patent Number: 4,917,023

[45] Date of Patent: Apr. 17, 1990

[54] SYSTEM FOR FIXING, ENCAPSULATING, STABILIZING AND DETOXIFYING HEAVY METALS IN METAL-CONTAINING SLUDGES, SOILS, ASH AND SIMILAR MATERIALS

[76] Inventor: Bradford H. Jones, 85 Portsmouth Ave., Stratham, N.H. 03885

[21] Appl. No.: 218,565

[22] Filed: Jul. 13, 1988

Related U.S. Application Data

[63] Continuation-in-part of Ser. No. 831,409, Feb. 20, 1986, Pat. No. 4,781,944.

[51] Int. Cl.$^4$ ............................................. D06F 75/00
[52] U.S. Cl. ................................ 110/230; 110/211; 110/229; 110/204
[58] Field of Search ............... 110/250, 229, 204, 346, 110/236, 230, 211

[56] References Cited

U.S. PATENT DOCUMENTS

| | | | |
|---|---|---|---|
| 4,050,900 | 9/1977 | Hobbs et al. | 110/250 X |
| 4,232,614 | 11/1980 | Fitch et al. | 110/346 R |
| 4,541,345 | 9/1985 | Grumplet et al. | 110/226 X |
| 4,759,300 | 7/1988 | Hansen et al. | 110/229 |
| 4,789,332 | 12/1988 | Ramsey et al. | 110/236 X |

*Primary Examiner*—Edward G. Favors
*Attorney, Agent, or Firm*—Samuels, Gauthier, Stevens & Kehoe

[57] ABSTRACT

A two zone pyrolysis unit having a first drying zone and a second pyrolysis zone is provided for detoxifying heavy metals contained in sludges, soils and similar materials. A condenser and an afterburner are in flow communication with the first and second zones respectively.

8 Claims, 1 Drawing Sheet

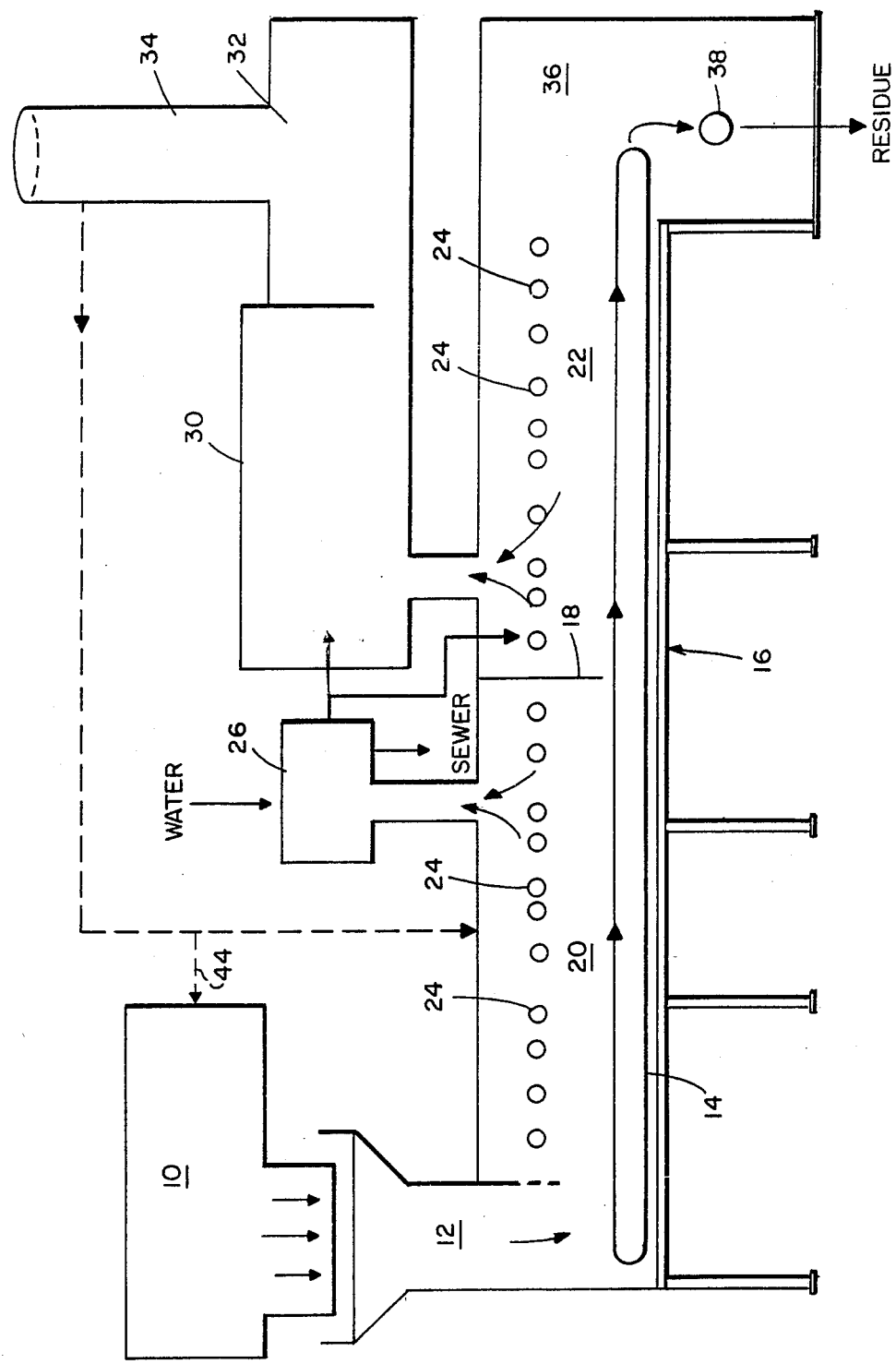

SYSTEM FOR FIXING, ENCAPSULATING, STABILIZING AND DETOXIFYING HEAVY METALS IN METAL-CONTAINING SLUDGES, SOILS, ASH AND SIMILAR MATERIALS

CROSS REFERENCE TO RELATED APPLICATIONS

This application is a continuation-in-part application, of Ser. No. 831,409 filed Feb. 20, 1986, now U.S. Pat. No. 4,781,944.

BACKGROUND AND BRIEF SUMMARY OF THE INVENTION

The present invention relates to a system for detoxifying heavy metals contained in sludges, soils, incinerated ashes and similar materials; being more particularly directed to a novel system for destroying potentially toxic volatile organics and solvents and for effecting the encapsulation, fixing and stabilizing of remaining residues to render them safe (by at least Environmental Protection Agency (EPA) standards) from the leaching out of, or latter exposure to, heavy metal products therein, such that the residues may be directly used in landfills or incorporated into building materials like concrete or asphalt, if desired.

Previous systems for the solution of the above problem have been made through the use of chemical fixation and stabilization techniques, including the combining of silicates and Portland Cement to produce a stabilized, solidified material. While such systems have had some effectiveness in binding heavy metals, the effectiveness in stabilizing volatile organics is questionable, and previous chemical stabilization processes unfortunately require increasing the volume of the sludge and/or ash by ten to twenty percent. The chemical solidified product may be landfilled or may be used for landfill cover material. The later-described fixed product of the present invention provides for about eighty seven percent less weight and seventy percent less volume, in some tests, and the volatile organics are destroyed.

The invention broadly comprises a system for volatilizing, fixing, stabilizing and effectively carbon bonding heavy metals in a metal-containing sludge, soil, ash or similar material that is not subject to the above-described disadvantages of prior chemical fixing and other techniques, but provides vastly improved, less costly and more efficacious stabilizing not only of the resulting residue but of the volatile organics and solvents driven off in the process as well.

The invention embodies a system that is uniquely adapted for carrying out one of the processes described in my parent application. Specifically, the system processes a metal-containing feed material, such as a mixture of 20 to 65% solids sewage sludge cake and inorganic residues. The wet feed is dried in an oxygen starved drying zone and then stabilized in an oxygen starved zone in which a char residue is formed and the volatile organic compounds are driven off. The heavy metals present are bound with carbon in the char residue and the volatile organic compounds are further incinerated in an afterburner. The resulting char residue has less volume than the original sludge or composite feed.

More particularly, the system provides a multizone starved air combustion unit capable of controlling temperature and residence time. The resulting residue contains an acid-insoluble char matrix. About twenty to fifty percent more residue is produced than with incineration, but the residue passes EPA's Extraction Procedure Tests for leaching heavy metals and is therefore well-suited for landfill disposal, or used as a lightweight aggregate. Heavy metals and other potentially toxic compounds are stabilized at temperatures below their volatilization temperature and below the temperature often used in other incineration or pyrolysis processes that do not produce a fixed residue. The thermal residence time is controlled to produce minimum weight without significant decarbonization (the latter being causable by excess oxygen). Toxic, volatile off-gas and odors are destroyed within a high temperature afterburner designed for appropriate residence time and temperature that will destroy the volatiles found in a particular metal-containing feed material.

While sludge incinerators and trash incinerators often produce ash residues containing toxic, leachable metals in their bottom ash and/or fly ash, the residue produced with the system of the present invention does not contain significantly soluble metals or metal oxides (e.g., chromium). The residue, furthermore, can be mixed with ten to fifteen percent, for example, of Portland Cement (on a weight basis), if desired, with the quantity of water equal to the weight of the residue, and some coarse sand. The resulting cemented residue material has a specific gravity of about one, it is fireproof, and it has sufficient structural strength to be safely used for lightweight building products.

Another illustrative application of the system is for stabilizing toxic metals within waste sludges from steel drum reconditioning plants, the empty drums containing a variety of residual materials which often contain toxic matallic and organic compounds. The resulting residues show a fifty percent reduction in volume with the toxic metals immobilized with carbon, and the solvents destroyed in the afterburner. The invention can also be used to process toxic waste and eliminate the need of disposing of these materials in hazardous waste landfills; with the residue used for landfill or solidified for use in building products such as cinder blocks, asphalt, concrete or other lightweight products, as before suggested.

As still another use, the system may aid in the recovery of chromium from the leather and metal plating industries since the char residue passes the EPA Extraction Procedure, indicating that the residue will not leach excessive quantities of chromium. Subsequent roasting of such residues containing chromium produces a chromate ash from which chromium can be extracted with the remaining insoluble residues treated by the invention to produce a non-toxic residue.

BRIEF DESCRIPTION OF THE DRAWING

The drawing is a process flow diagram of a system embodying the invention.

DESCRIPTION OF THE PREFERRED EMBODIMENT

The apparatus of the invention in the preferred embodiment is a structurally modified prior art unit, of Shirco Infrared Systems, Inc., available from the John Zink Co. of Tulsa, Oklahoma. The system is shown generally in the drawing and comprises a blender/classifier 10 such as a high temperature (300° F.) enclosed pug-mill which discharges into an air lock 12. The feed is deposited about 2" deep on an endless fiber blanket 14. The blanket 14 travels through a two zone pyrolysis unit 16. A baffle 18 defines the two zones, a drying zone 20 and a stabilization zone 22. The zones are brought to temperature by infrared heaters 24. A condenser 26 receives the effluent from the drying zone 20. The condensate, primarily water, is discharged as desired. An afterburner 30 receives the effluent from the stabilization zone 22. The discharge from the afterburner 30 enters a tempering duct 32 which includes a water spray system. The inducing fan and duct work is at 34. The char residue on the belt passes into a cooling zone 36. From the belt 14 the char residue drops into a screw conveyor 38 to be discharged.

The primary changes to the prior art unit are the use of the baffle and the condenser and the location of the dryer. These changes are made in order to practice the process disclosed herein and in my parent application.

There is a criticality in the pyrolyzing or heating of the feed in the absence of oxygen that brings the process to a point where the carbon-containing material in the sludge or similar material becomes bonded to or fused with the heavy metal content. This resides in the stabilization zone 22 where substantially all the volatile organics and solvents in the original sludge or metal containing feed material are driven off and destroyed, and a char residue is formed at a point of substantially minimum weight.

The char residue, still in the absence of oxygen, is cooled down in the zone 36 to a temperature where it will not ignite if exposed to air. Thereafter, cooling continues to ambient temperature.

Under such conditions, it is found that the carbon is bonded or fixed to the heavy metal residue in a state where it is substantially non-leachable and where is it readily usable with safety for such purposes as landfill or for building materials. To prevent dusting, water may be added in the utilization of the residue product and/or it may be encapsulated in cement or the like for producing fireproof materials, as before explained. Alternatively, silicate and clay-type materials may be added to the metal-containing feed material to result in non-dusting cooled residue.

It is important that there be sufficient carbon material in intimate contact with the heavy metals in the sludge or other material to enable this complete bonding, encapsulation, fixing, fusing and stabilizing of the heavy metals in the residue, and this may be provided in solid form as from sludges and liquids. Hydrocarbon solvents may be added to the solid materials as well.

The following non-limiting example describes the operation of the system.

The metal-containing feed material is mixed with a carbon source such as municipal wastewater treatment plant sludge to provide direct contact of the metals in the feed with a sufficient amount of a carbon source to achieve the fixation step. Referring to the drawing, a feed mixture, 30 to 65% dry solids consisting of dewatered sewage sludge cake and incinerator ash (fly ash, bottom ash or a combination of both) is introduced into and blended by the blender/classifier 10 at a rate of about 2000 to 4000 pounds per hour. This feed is discharged from the blender/classifier 10 at approximately 300° F. to ambient temperature. It falls through the air lock 12 and is received on the upstream end of the fiber belt 14 at a depth of about two (2") inches. The zone 20 is fired by infrared heaters 24 to a temperature of about 800° F. The zone 20 is a largely air tight, oxygen-free drying oven environment. The water content in the feed is vaporized in this zone and is condensed in the condensor 26 and discharged at a rate of about 2.5 to 5.0 gpm of condensate. The baffle 18 prevents the moisture from entering the zone 22 and directs it to the condenser 26. The removal of the water vapor in the first zone enhances the economics of carbon bonding in the second zone. A separate predryer can also be used which does not have to operate under oxygen-free conditions.

The dried feed then moves into the zone 22 fired by infrared heaters to a temperature of 900° F.

The zone 22 is a largely air tight, oxygen free, combustion furnace environment for pyrolysis operating below the volatization temperature of most heavy metals, but at a sufficient temperature to drive off the volatile organics and solvents as off gases. In this zone, the carbon bonding to the heavy metals occurs and the char residue is formed. The char residue on the belt 14 enters the cooling zone 36 where it cools using a water spray to below about 250° F. The screw conveyor discharges the cooled char residue at a rate of about 200 to 400 pounds per hour. The total processing time from the introduction of the feed on the belt 14 to the discharge of the char from the belt is about 30 minutes.

The afterburner 30 further oxidizes and destroys the off gases and volatiles at about 1800° F.; though if highly toxic wastes containing PCBs, Dioxin, etc. are used, the afterburner temperature may be raised to around 2400° F. If desired, as shown in dotted lines, the off gases or heat from the afterburner exhaust at 34 may be used to preheat the feed in the pug mill at 44 or to heat the drying zone at 46. Other structural modifications may be made to the system within the scope of the invention. Different types of heat sources may be used, different blenders, discharge screws, etc.

Having described my invention, what I now claim is:

1. A system for fixing and stabilizing heavy metals contained in a feed such as a metal-containing sludge, soil, ash or similar material and having a carbon source which comprises:

a two zone pyrolysis unit having
   a first drying zone to remove water from the feed as water vapor;
   a second substantially oxygen-free pyrolysis stabilization zone downstream of the first drying zone to form char residue with carbon fused to the metal and to form an effluent stream of volatile organics and solvents; means to inhibit the flow of water vapor from the first zone to the second zone;

a condenser in fluid flow communication with the drying zone to condense the water vapor;
   an after burner in fluid flow communication with the second zone to oxidize the volative organics and solvents;
   a third cooling zone downstream of the second zone to cool the residue;
   means to heat said first zone to a first temperature and to heat said second zone to a second temperature distinct from the first temperature;
   means to introduce the feed into the first zone;
   means to discharge said char from the third zone; and
   means to transport the feed through said first, second and third zones.

2. The system of claim 1 wherein the means to introduce the feed into the first zone includes a blender classifier.

3. The system of claim 1 wherein the means to discharge the residue includes a screw conveyor.

4. The system of claim 1 wherein the means to transport the feed includes an endless belt.
5. The system of claim 1 wherein the means to heat the zones include infrared heaters.
6. The system of claim 1 which includes:
means to preheat the feed.
7. The system of claim 1 wherein the means to heat the first zone includes means to recycle the exhaust gases from the afterburner to said first zone.
8. The system of claim 6 wherein the means to preheat the feed includes means to recycle the exhaust gases from the afterburner to the feed upstream of the first drying zone.

* * * * *